(12) United States Patent
Shintani

(10) Patent No.: US 8,595,136 B2
(45) Date of Patent: *Nov. 26, 2013

(54) COORDINATING LICENSE ACTIVATION OF LICENSABLE AUDIO VIDEO (AV) DEVICE COMPONENTS BETWEEN CONTRACT MANUFACTURER AND BRAND MANUFACTURER

(71) Applicant: Sony Corporation, Tokyo (JP)

(72) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,930

(22) Filed: Feb. 12, 2013

(65) Prior Publication Data
US 2013/0159177 A1 Jun. 20, 2013

Related U.S. Application Data

(63) Continuation-in-part of application No. 13/073,047, filed on Mar. 28, 2011, now Pat. No. 8,401,935, which is a continuation-in-part of application No. 12/970,215, filed on Dec. 16, 2010.

(60) Provisional application No. 61/412,552, filed on Nov. 11, 2010.

(51) Int. Cl.
*G06Q 30/02* (2012.01)

(52) U.S. Cl.
USPC .............. 705/40; 705/34; 705/37; 725/131; 348/180; 348/143

(58) Field of Classification Search
USPC ............. 705/30, 34; 725/131, 30; 348/180
See application file for complete search history.

(56) References Cited

U.S. PATENT DOCUMENTS

| 7,343,321 | B1 | 3/2008 | Hill et al. |
| 2010/0228679 | A1 | 9/2010 | Scapa |
| 2011/0015968 | A1 | 1/2011 | Carlson |

*Primary Examiner* — Vanel Frenel
(74) *Attorney, Agent, or Firm* — John L. Rogitz; John M. Rogitz

(57) ABSTRACT

A server for reducing license fee payments to account for non-use of a licensed component includes a processor and a computer readable storage medium. The computer readable storage medium is accessible to the processor and bears instructions which, when executed by the processor, cause the processor to determine, for a license period, a first number of consumer electronic (CE) devices that have activated the licensed component. The instructions also cause the processor to determine, for the license period, a second number of CE devices that have not activated the licensed component. In addition, the instructions cause the processor to generate a license fee payment index related to the licensed component based on the first number and excluding the second number.

20 Claims, 10 Drawing Sheets

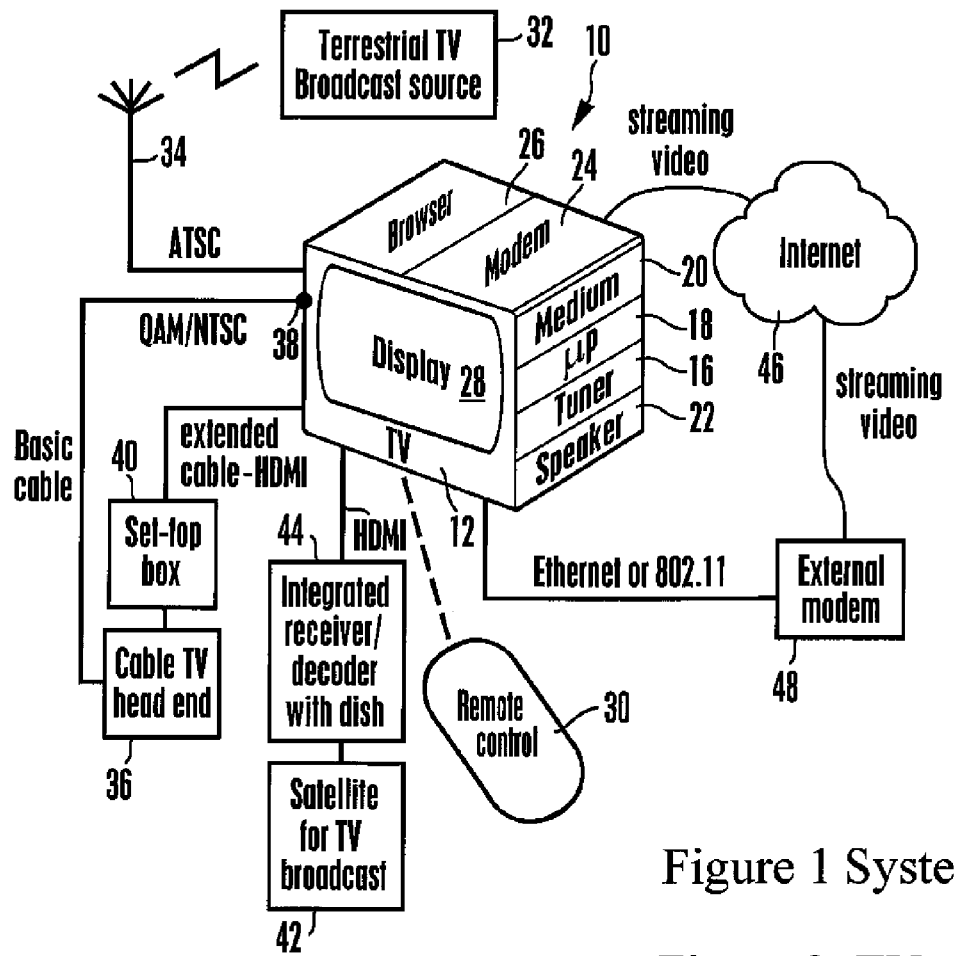
Figure 1 System
Figure 2 TV
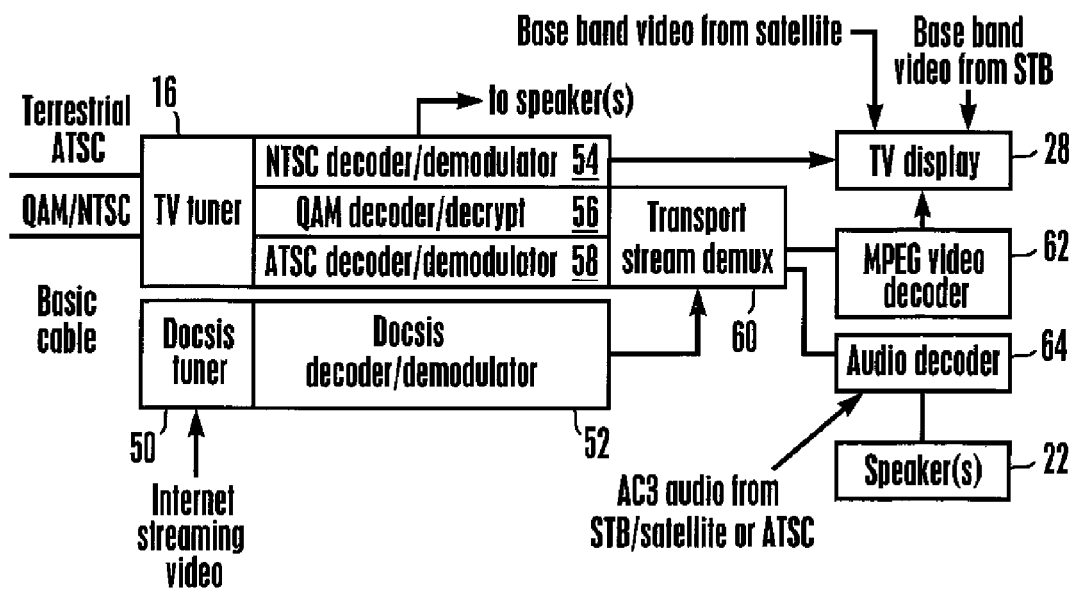

Setup logic auto license logic

Via Automated Phone Support licensing logic

COORDINATING LICENSE ACTIVATION OF LICENSABLE AUDIO VIDEO (AV) DEVICE COMPONENTS BETWEEN CONTRACT MANUFACTURER AND BRAND MANUFACTURER

This is a continuation-in-part of U.S. patent application Ser. No. 13/073,047, filed Mar. 28, 2011, from which priority is claimed. This application also claims priority from U.S. provisional application 61/412,522, filed Nov. 11, 2010. Both U.S. patent application Ser. No. 13/073,047 and U.S. provisional application 61/412,522 are incorporated by reference in their entirety herein.

FIELD OF THE INVENTION

The present application relates generally to coordinating license activation of licensable audio video (AV) device components between a contract manufacturer and a brand manufacturer whose devices the contract manufacturer make under contract.

BACKGROUND OF THE INVENTION

Televisions incorporate a host of technologies to enable a viewer to watch programming from a variety of sources. These sources include terrestrial broadcast sources of analog (using National Television System Committee, or NTSC, format) and digital (using Advanced Television System Committee, or ATSC, format) TV signals. ATSC signals typically use video compression known as Motion Picture Experts Group (MPEG-2) and TVs must consequently support MPEG-2 decompression if they support ATSC programming.

Cable-provided "basic" television programming can also be provided in NTSC or quadrature amplitude modulation (QAM) format. Cable-provided "enhanced" programming may also be provided using high definition multimedia interface (HDMI) principles. Likewise, satellite-provided TV signals may be received in HDMI. As well, video from the Internet can be displayed on many modern TVs in a variety of formats, including data over cable service Internet specification (DOCSIS) format. Furthermore, TVs are often configured to support multiple audio formats, including advanced audio coding (AAC), Audio code 3 (AC3), digital theater system (DTS), and so on. And as contemporary viewers know, TVs are expected to support the presentation of electronic program guides (EPGs).

SUMMARY OF THE INVENTION

As understood herein, various TV technologies require license fees to be paid. As further understood herein, many technologies that must be built in to modern TVs to support various program sources may not be used. Nonetheless, license fees for the unused technologies are still paid, unnecessarily cascading cost. Moreover, present principles recognize that advantages can accrue to licensors from incremental versus bundled licenses since when features are added to an existing product, additional royalties could be extracted from the licensee. Also, selling a product in a less capable state can lower the selling price and increase sales volumes so that more purchasers are available to decide to activate licensable features after buying a product and developing a desire for better capability at only incremental cost, potentially leading to overall increased royalties.

Accordingly, a server for reducing license fee payments to account for non-use of a licensed component includes a processor and a computer readable storage medium. The computer readable storage medium is accessible to the processor and bears instructions which, when executed by the processor, cause the processor to determine, for a license period, a first number of consumer electronic (CE) devices that have activated the licensed component. The instructions also cause the processor to determine, for the license period, a second number of CE devices that have not activated the licensed component. In addition, the instructions cause the processor to generate a license fee payment index related to the licensed component based on the first number and excluding the second number.

In some embodiments, the instructions, when executed by the processor, cause the processor to transmit to CE devices a query asking the CE devices whether the licensed component was activated, and accordingly the first and second numbers may be based on responses received from the CE devices. If desired, the query can be sent over a network.

Also in some embodiments, the instructions, when executed by the processor, cause the processor to generate queries to users of CE devices asking the users whether the licensed component was activated, and accordingly the first and second numbers may be based on responses received from the users. Thus, if desired, the queries may be sent to users via electronic means. In addition to or in the alternative, the queries may be sent to users via regular mail.

Furthermore, in exemplary embodiments the licensed component may be determined as having been activated in a licensed CE device by mere use of the licensed component. In addition to or in lieu of mere use, the licensed component may also be determined as having been activated in a licensed CE device by execution of a license transaction involving the licensed CE device to obtain a license key to unlock the licensed component for use in the licensed CE device.

Moreover, in addition to or in lieu of both mere use and/or execution of a license transaction as set forth above, the licensed component may be determined as having been activated in a licensed CE device by execution of a license transaction involving the licensed CE device to make available to the licensed CE device a critical piece of code without which the licensed component is useless for its licensed function. The critical piece of code may be incorporated into the licensed component upon successful consummation of the license transaction to configure the licensed component for its intended purpose in the licensed CE device.

The critical piece of code, prior to the license transaction, may be stored remotely from the licensed CE device. In addition to or in lieu of storing the piece of code remotely from the licensed CE device, the critical piece of code, prior to the license transaction, may be stored locally to the licensed CE device in a storage location that prevents incorporation of the critical piece of code in the licensed component unless the license transaction is consummated.

Additionally, in exemplary embodiments the processor may determine the first and second numbers based on responses received from license activation queries to CE devices and/or to users thereof, and the first number but not the second number may include non-responding CE devices where a non-responding CE device may be established by a lack of a response to the license activation query associated with the non-responding CE device.

Referring again to the first and second numbers, if desired, the processor can determine the first and second numbers based on responses received from license activation queries to CE devices and/or to users thereof. Thus, the second number but not the first number may include non-responding CE devices, where a non-responding CE device may be established by a lack of a response to the license activation query associated with the non-responding CE device.

In addition to or in lieu of the processor determining the first and second numbers based on responses received from license activation queries to CE devices and/or to users thereof, the processor may also determine the first and second numbers based at least in part on a record of consummated license transactions from individual CE devices involving the licensed component. Further, in addition to or in lieu of the two ways the processor may determine the first and second numbers as set forth above, the processor may determine the first and second numbers without querying CE devices and/or users thereof regarding license transactions involving the licensed component.

Moreover, in exemplary embodiments, the first number may be increased or decreased to account for a total number of CE devices at which license pricing changes. Additionally, in some embodiments the license period for which the first number is reported may be advanced or delayed to account for a total number of CE devices at which license pricing changes.

In another aspect, a server for reducing license fee payments to account for non-use of a licensed component includes a processor and a computer readable storage medium accessible to the processor. The medium bears instructions which, when executed by the processor, cause the processor to determine, for a license period, a first number of consumer electronic (CE) devices that have activated the licensed component. The instructions also cause the processor to determine, for the license period, a second number of CE devices that have not activated the licensed component. In addition, the instructions cause the processor to generate a request to a licensor of the licensed product for a refund of license fees based on the second number.

In yet another aspect, a method includes determining a number of consumer electronic (CE) devices that have activated a least one licensed component associated with each CE device for a license period. The number is determined by querying the CE devices, and/or querying at least one user of respective CE devices. The method then includes determining a license fee payment amount based on the number.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a block diagram of an example TV;

DETAILED DESCRIPTION OF THE PREFERRED EMBODIMENT

Figure 3:
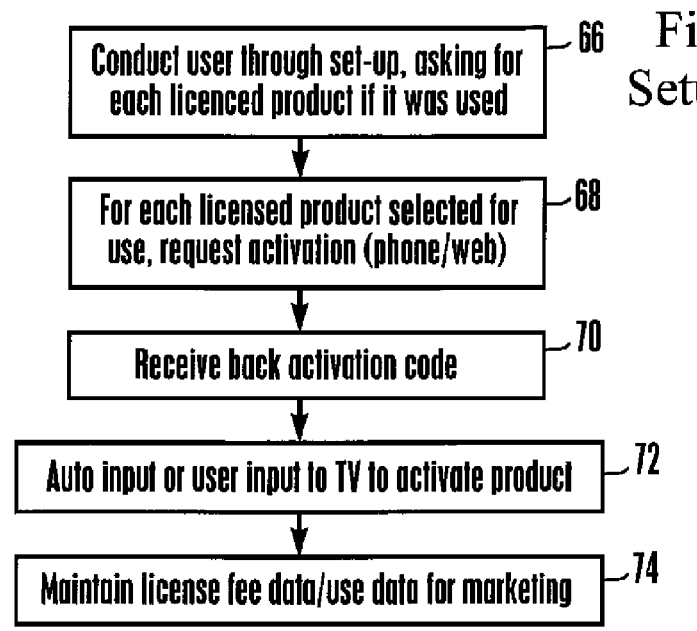
FIG. 3 is a flow chart of non-limiting TV set up logic in accordance with present principles.

Referring initially to the non-limiting example embodiment show in FIG. 1, a system 10 includes an audio video device 12 such as a TV including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Now referring to FIG. 3, at block 66 a user of the TV 12 can be conducted, using onscreen user interfaces (UI), through a set-up routine upon first power on or thereafter from a menu to set up various features of the TV. As an example, the user may be asked, for one or more licensable components within the TV, if the user desires to use that component. This may be done implicitly, e.g., by asking the user if the user wishes to automatically scan the broadcast spectrum to detect channels, in which case it may be inferred that the ATSC decoder/demodulator 58 and MPEG decoder 62 will be required and, hence, that licenses to use those components will be needed. Also, in this latter case it may be inferred that a license to the terrestrial broadcast EPG may be required, whereas such a license would not be required if terrestrial broadcast were not being used as an input source.

Or again, the user may be given the choice to receive Internet video through the built-in modem 24 or from an external modem 48 and if the latter is chosen, no license need be obtained for the internal browser 26; otherwise, a license may be required to use the internal browser 26.

Proceeding to block 68, for each license that is inferred to be required based on the user set-up selections at block 66, the TV 12 uploads a request for the license over the Internet, for example, or back through a two-way cable system, etc. Or, as explained further below the request may be made by telephone. Regardless of how made, the request typically identifies the component for which a license is required based on user input at block 66 along with a unique identification of the TV, e.g., a hash of the TV model number and serial number, in some embodiments encrypted if desired. Or, the unique identifier may be a high definition content protect (HDCP) key selection vector (KSV) of the device 12, or a media access control (MAC) address, or a digital transmission content protect (DTCP) certificate, one or more of which may be hashed with the serial number and/or model name of the device 12. This hashed result can be sent to the server. The server can now uniquely identify the device. In the event the device needs to be repaired and the unique ID contained in the device is changed, the device's previous identity advantageously can be migrated to a new hashed ID. To simplify this migration of the ID, the server can generate a unique key, and send it to the repaired device after receiving the initial hashed ID and notification (e.g., from the device 12) that the device was repaired and requires a new unique ID. In some implementations the user of the device 12 can manually recall the original ID, send it to the server, and the server, using the original ID, migrates records of the licenses previously enabled by the device 12 to the new ID.

The request may be made at set-up time. Alternatively, the request may be cached for later upload when, e.g., an appropriate broadband connection is sensed. In any case, the request may be sent to an Internet server at a prestored Internet address or to a cable head end or to another appropriate licensing entity or agent.

Block 70 indicates that assuming it passes authentication the TV 12 receives back the license in the form of licensing information, typically a code that must be input to the TV processor 18 to enable or unlock the associated component. Or the associated component may require software code to function and a critical piece of the code which is related to the licensable feature may be omitted when the device is vended, with this critical piece of code being supplied at block 70 to enable the licensable feature of the component. Prior to provision of the critical piece of code, the licensable feature of the component in effect is not merely locked out, but rather is effectively missing altogether, even though other parts of software code needed to execute the licensable feature are vended with the device.

The code may be automatically input to the appropriate internal components of the TV at block 72 or the code may be displayed on the TV and the user prompted by means of an onscreen UI to enter the code using, e.g., the RC 30. Proper input of the code activates the related component within the TV. Block 74 simply indicates that license fee data is maintained and used to generate billing information from the licensing agency to the manufacturer of the TV, and may also be used to generate marketing data as discussed further below. The data may be kept in the TV until uploaded to a licensing entity/agent by means noted above.

Figure 4:
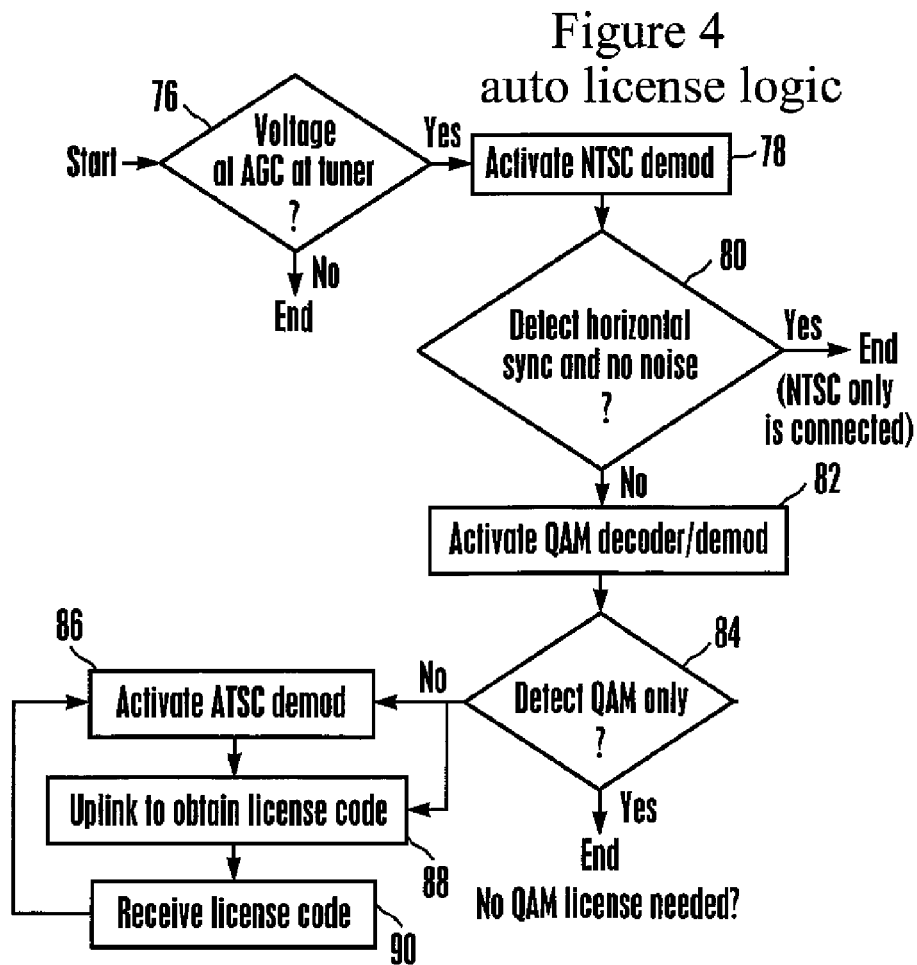
FIG. 4 is a flow chart of non-limiting logic for automatically detecting whether an ATSC demodulator is required to be activated.

FIG. 4 shows that automatic license determinations may be made outside of a user set-up routine if desired. In the example shown in FIG. 4, commencing at decision diamond 76 it is determined whether a predetermined physical condition exists in the TV, e.g., a particular kind of connection, from which it may be inferred what licensable components will be required. In the example of FIG. 4, the physical condition is the presence of a voltage in the automatic gain control (AGC) circuitry of the tuner 16, which would occur when, for instance, a connection is made at the TV chassis to the terrestrial antenna 34 or when a cable from the wall is connected to the F-type connector 38.

When the tested-for physical condition exists, the logic flows to block 78, in this example to activate the NTSC demodulator 54. This is done recognizing that NTSC demodulators typically require no licenses, so to avoid unnecessarily requesting licenses, the signal at the tuner 16 is first tested to determine if it is an NTSC signal. PAL or SECAM can also be used. Decision diamond 80 indicates that the test may be whether "noise", is present in the signal.

If the test indicates that NTSC signals only are present the logic ends, but otherwise the logic flows to block 82 to activate the QAM decoder/demodulator 56. If QAM only is detected (by the QAM decoder/demodulator 56 recognizing QAM signals and/or no noise) the logic ends, but if the QAM decoder/demodulator 56 does not recognize the signal, this indicates that the signal is neither QAM nor (from decision diamond 80) NTSC, with the inference thus being that the signal is ATSC requiring use of the ATSC decoder/demodulator 58, which is activated at block 86 to process the signal. At block 88 an uplink is obtained by the TV processor 18 to the above-described licensing entity/agent to obtain the license code discussed above using the unique ID of the TV, and at block 90 the code is received and used as necessary to permit use of the ATSC decoder/demodulator 58. Note that present principles are not limited to ATSC tuners and can include, as additional examples, orthogonal frequency division multiplex (OFDM) and Integrated Services Digital Broadcasting (ISDB) and ISDB-T (international) devices as well.

Or, the step at block 90 can be omitted and the ATSC decoder/demodulator 58 immediately activated on the assumption that the processor 18 is programmed to send a message to the licensing entity/agent that licensing accounting is to be generated after activation of the ATSC decoder/demodulator 58.

Yet again, as shown in dashed lines in FIG. 4 the logic may flow first from decision diamond 84 to blocks 88 and 90 to obtain the licensing "unlock" code and then back to block 86 to activate the ATSC decoder/demodulator 58 using the code, to ensure that no use may be made of the ATSC decoder/demodulator 58 until such time as the licensing entity/agent has been informed of its use, has authenticated the TV for the necessary ATSC license, and has determined that under business rules the license code should be downloaded to fulfill the request.

Additional example inference rules that may be employed pursuant to automatically obtaining needed component licenses after vending the TV to avoid paying for unnecessary licenses prior to sale of the TV include, if there is ATSC present, it is less likely that QAM will be found; if ATSC is present, the total number of ATSC channels will be much smaller than the number for QAM channels. Also, when signals are received from an external modem 48, audio video programming does not require use of the built-in browser 26 and so receipt of video over an Ethernet link without receipt of signals at the internal modem 24 may be inferred to mean that the browser 26 is not in use.

Figure 5:
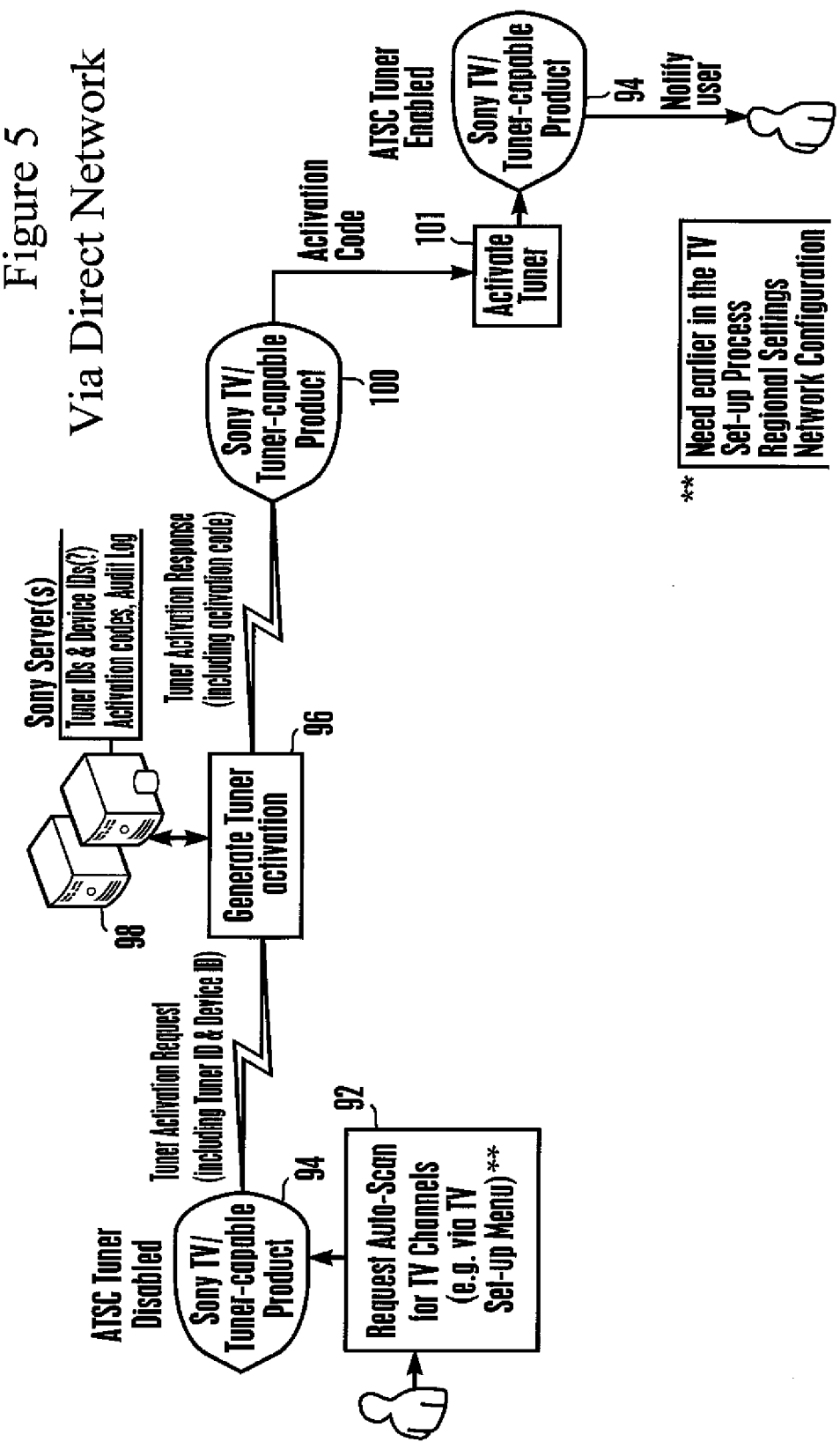
FIGS. 5-7 are schematic diagrams illustrating alternate methods for activating an ATSC demodulator.
Figure 6:
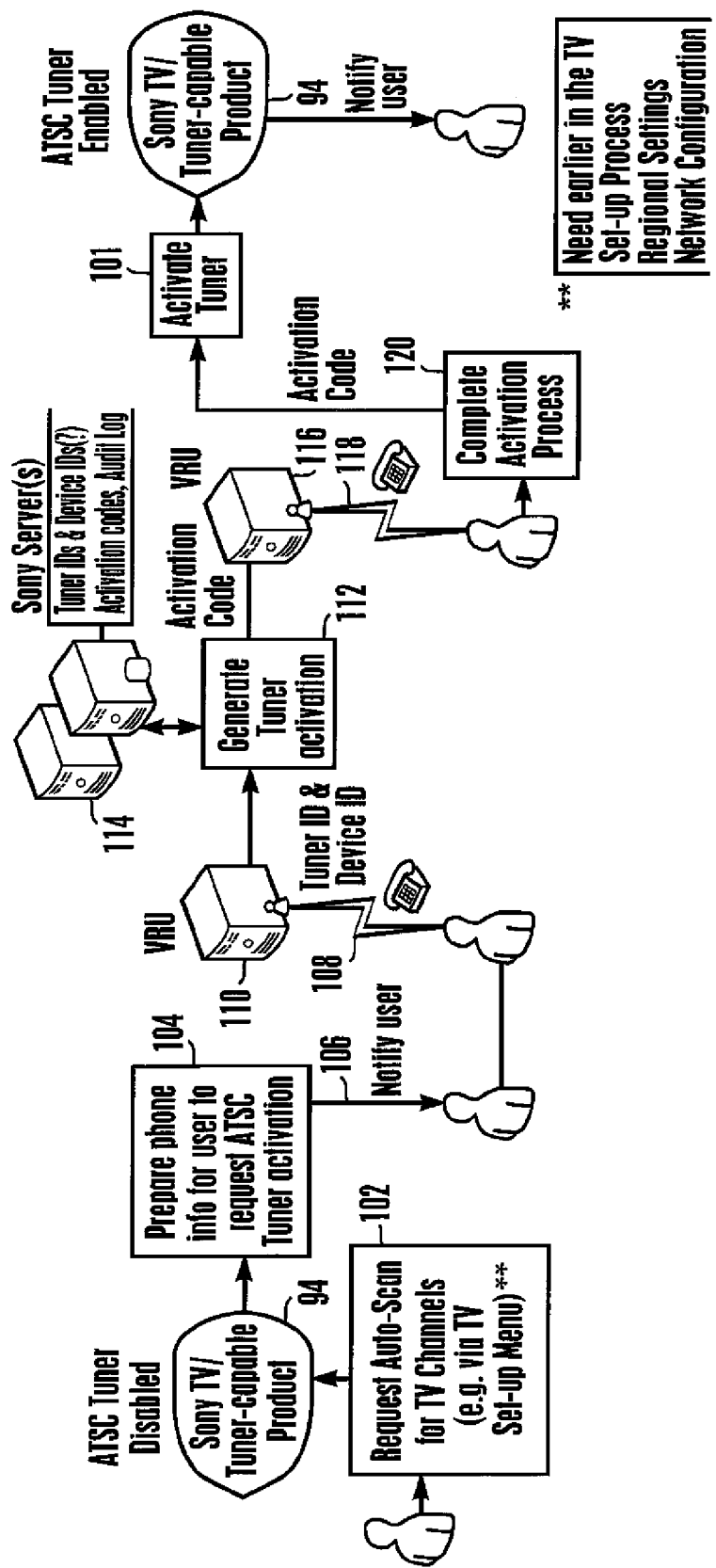
Figure 7:
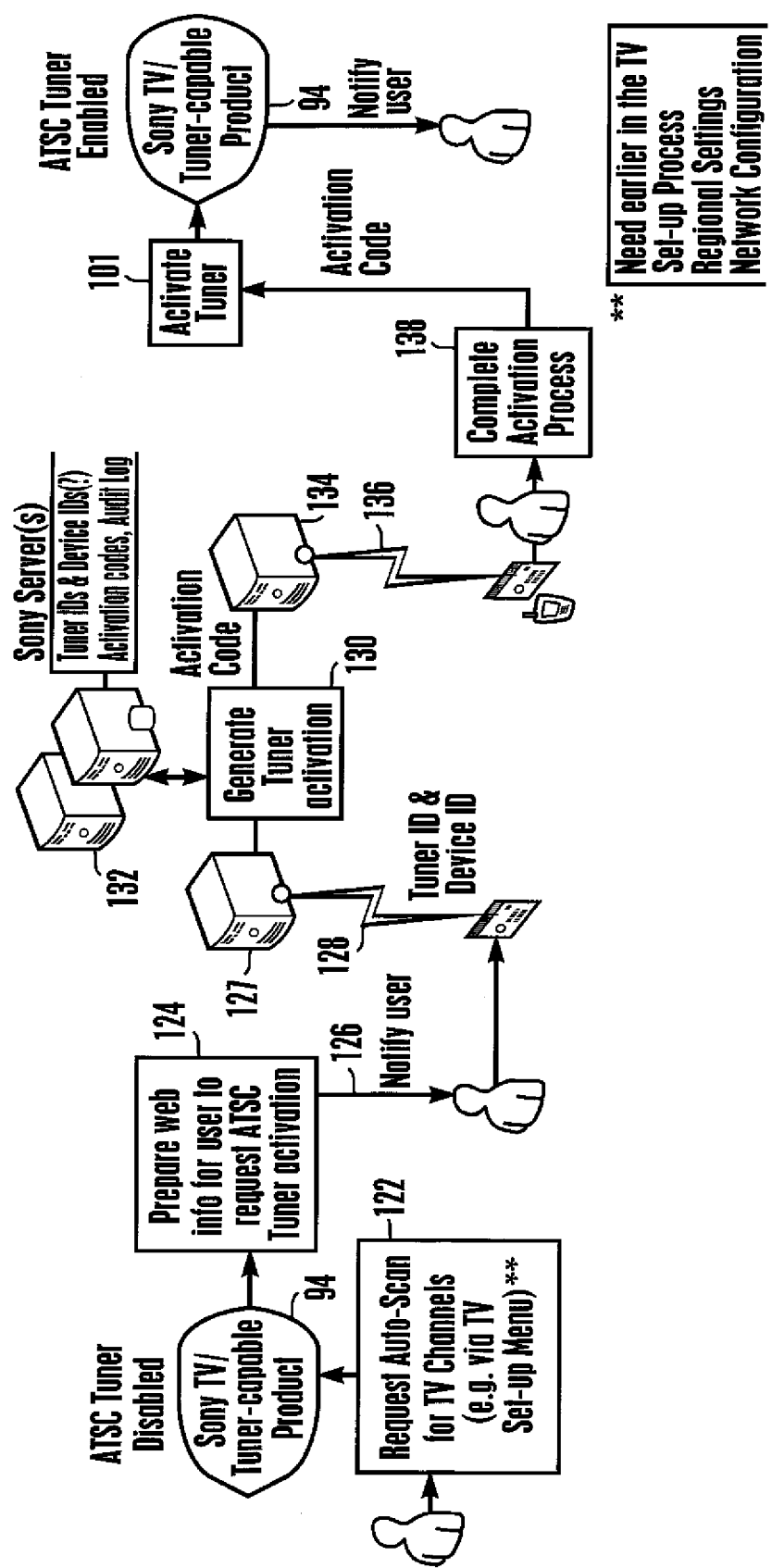

FIGS. 5-7 illustrate logic that may be used during setup to obtain licenses. Using, e.g., the RC 30, a person may input 92 a request to conduct auto-scan of available terrestrial or cable or satellite channels from, e.g., an onscreen setup menu presented on an audio video display product 94 (which may be implemented by the TV 12). In response, the AV display product sends an activation request for, e.g., the ATSC decoder/demodulator 58 which may include the tuner ID and product 94 ID and/or the decoder/demodulator 58 ID/product 94 ID. Activation of the ATSC decoder/demodulator 58 is executed at 96 using activation codes from one or more licensing entities/agents such as server 98, provided the licensing entities/agents determine, based on the information received from the product 94, that the product is entitled to a license for the requested component.

A log may be kept by the licensing entities/agents indicating what products and what components in those products have been activated and based on that log, licensing accounting data may be generated for purposes of presenting licensing invoices for activated components to the manufacturer of the product 94. In any case, 100 indicates that the product 94 receives the activation response, e.g., activation codes, to activate the demodulator/decoder 58 at 101, which converts the product 94 to an ATSC-capable device. The user may be notified using onscreen notification that ATSC programming may now be viewed using the product 94.

FIG. 6 shows an alternative embodiment. Using, e.g., the RC 30, a person may input 102 a request to conduct auto-scan of available terrestrial or cable or satellite channels from, e.g., an onscreen setup menu presented on an audio video display product 94 (which may be implemented by the TV 12). In response, at 104 telephone information including a phone number to a licensing entity/agent is prepared and the user notified 106 of the information by means of, e.g., a user interface or prompt presented on the product 94. The user enters 108 the information into a telephone, either by speaking the number or by holding the telephone adjacent a speaker on the product 94 for receiving dual tone multifrequency (DTMF) tones from the product that are detected by the telephone and used to automatically dial the number using, e.g., a voice response unit (VRU) 110.

Other alternate embodiments involve sending short message service (SMS) messages to a server to send the above information or scanning bar-type codes on the TV or component to send the requisite information to the server to obtain the license. In any case, determining what licenses are needed may be accomplished upon start up and/or periodically during operation.

Tuner activation is generated at 112 by licensing entities/agents 114 such as Internet servers and the activation code discussed above sent 116 to the VRU 110, which presents the code to the user to complete the activation process at 120. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

FIG. 7 shows another alternative embodiment. Using, e.g., the RC 30, a person may input 122 a request to conduct auto-scan of available terrestrial or cable or satellite channels from, e.g., an onscreen setup menu presented on an audio video display product 94 (which may be implemented by the TV 12). In response, at 124 Internet information including an Internet address of a licensing entity/agent is prepared and the user notified 126 of the information by means of, e.g., a user interface or prompt presented on the product 94. The user enters 128 the information into, e.g., a home computer 127. Tuner activation is generated at 130 by licensing entities/agents 132 such as Internet servers and the activation code discussed above sent 134 to the computer, which presents 136 the code to the user by means of, e.g., a web page or telephone to complete the activation process at 138. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

Alternatively, licensing information may be exchanged using short message service (SMS) codes or by using bar codes. To use bar codes the TV can include a camera that images the bar codes on various components, which are interpreted by the processor 18 as identifying information.

In some instances, if only a limited number (e.g., two) NTSC channels are needed, a limited and less expensive license may be requested and granted to permit access to only those two channels through the NTSC demodulator with a license being requested and granted to any component such as a stereo audio decoder should the legacy device (typically, a VCR) use such audio.

Figure 8:
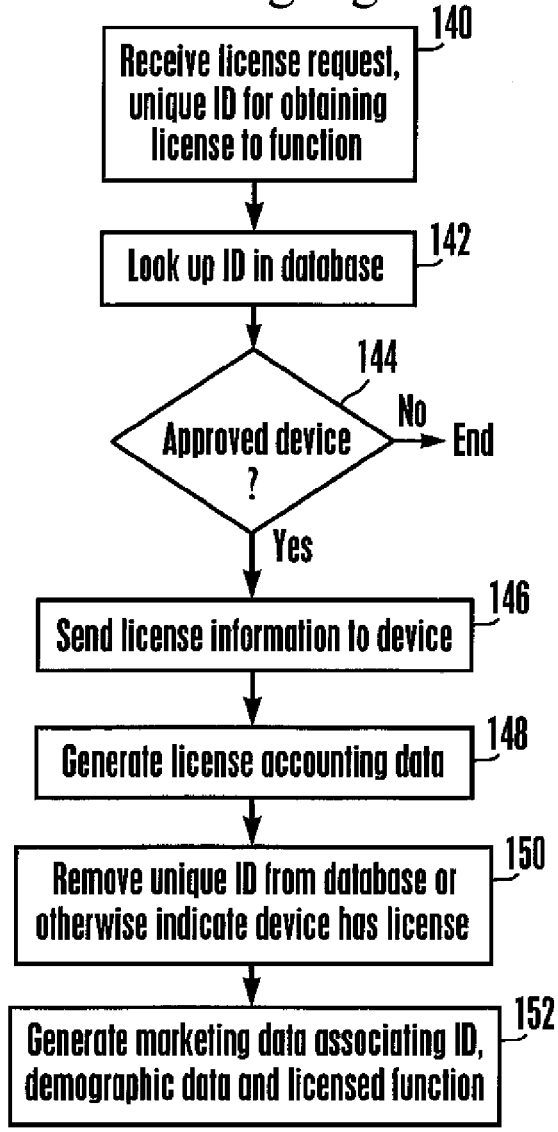
FIG. 8 is a flow chart of non-limiting logic for licensing a component in a TV.

FIG. 8 shows logic that may be executed by a licensing entity/agent computer. Commencing at block 140, a license request from, e.g., the TV 12 is received at, e.g., any of the above-described servers or head ends, which are programmed with software to execute the logic shown in FIG. 8. The unique ID discussed above is looked up at block 142 and the requesting device is authenticated at decision diamond 144 by, e.g., determining if the device is on a list of approved devices. If desired, it may be further determined whether a license for the particular licensable component that is the subject of the request has already been granted and if so, authentication fails. If the requesting device is approved and a license for the licensable component that is the subject of the request has not already been granted, the logic moves to block 146 to send license information, e.g., activation codes, to the requesting device.

Block 148 indicates that license accounting data is generated pursuant to sending the activation code to the requesting device. This accounting data can be used to effect remuneration from the manufacturer of the requesting device to the licensing authority for the component that is the subject of the request. At block 150 the authorized device database is modified to record the grant of the license.

Marketing data may be generated at block 152 based on the license grant. As an example, the total number of devices vended with the licensable component may be compared against the number of licenses granted to requesting devices to ascertain usage of the component compared to other components within the requesting device. For instance, it might be noted that 30% of vended devices of a particular TV model ever request activation of the ATSC tuner. This data can moreover be correlated to demographic data obtained during device registration so that, as an example, of the 30% of devices requesting activation of the TV tuner, it can be known which geographic region was more likely to request such activation, or which demographic age group, etc. It may be further ascertained, using device registration information submitted by purchasers, that of the devices requesting activation of the ATSC tuner, for example, 90% of those devices were second or third home TVs that consequently can be inferred to lack a cable or satellite hookup.

It is preferred that once a licensable component has been activated by obtaining a license for it, it cannot subsequently be deactivated by the user, to avoid multiple license payments for the same component. Accordingly, the TV processor 18 may be programmed to refuse deactivation commands from the user if any are input for any component that has been activated and licensed, at least insofar as deactivation would require another license to reactivate.

Verification of license may also be provided by the TV processor so that, for example, if a component license is requested by the TV but the corresponding feature never used within some period of time, the TV can retract the license request and any license fees refunded as a result.

Figure 9:
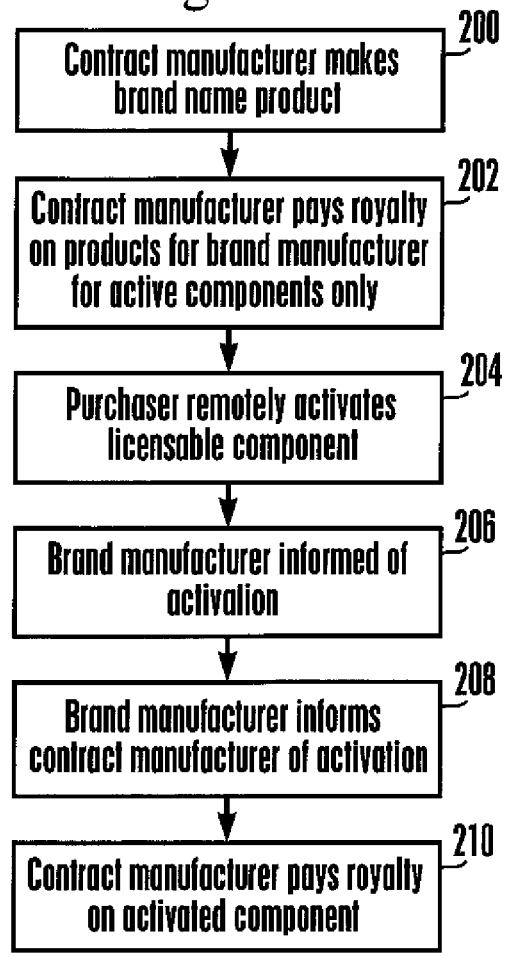
FIG. 9 is a flow chart showing the coordination of license activation for a licensable audio video (AV) device component between a contract manufacturer of the AV device and the brand name manufacturer.

FIG. 9 shows logic for the coordination of license activation for a licensable audio video (AV) device component between a contract manufacturer (CM) of the AV device, and the brand name manufacturer (BNM) under whose brand and auspices the contract manufacturer makes the CE device, with the BNM typically remaining responsible for sales of CM-made CE devices. Commencing at block 200, the CM makes a brand name CE device with licensable components, some of which may be activated and some of which may be deactivated at the time of sale. At block 202 the CM, on behalf of the BNM, pays royalties for those licensable components which are activated for initial sale. Licenses are not paid for licensable components which are disabled or deactivated for sale.

A purchaser then buys the CE device at block 204 and subsequently activates one or more of the deactivated licensable components in accordance with prior disclosure. Since activation messages are sent through the BNM at block 206, at block 208 the BNM informs the CM of the activation of the licensable component(s).

Consequently, the CM, on behalf of the BNM, can pay the necessary royalties on the newly activated licensable components at block 210. The CM and BNM may agree, however, that the above activation messages, in some implementations, may be sent directly to the CM, bypassing the BNM and thus altering the above logic to move from block 204 after informing the CM from the CE device of the activation directly to block 210.

Figure 10:
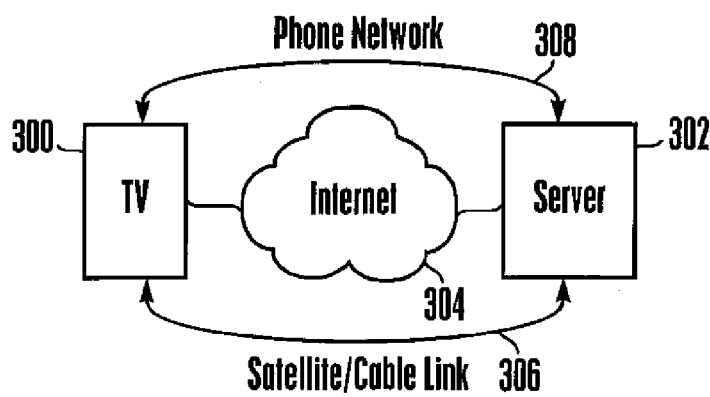
FIG. 10 is another block diagram of a non-limiting example system in accordance with present principles.

Turning now to FIG. 10, a TV 300 in accordance with present principles and a server 302 also in accordance with present principles are shown. To undertake present principles, the TV 300 and server 302 may be in communication with each other over, e.g., the Internet 304, a satellite/cable link 306, a telephone network 308, and/or any suitable direct communication means (e.g., a direct connection using a USB cable). It is to be understood that the server 302 may be used at least in part for reducing license fee payments to account for non-use of a licensed component, and may therefore include at least one processor and at least one computer readable storage medium to undertake/execute present principles.

Figure 11:
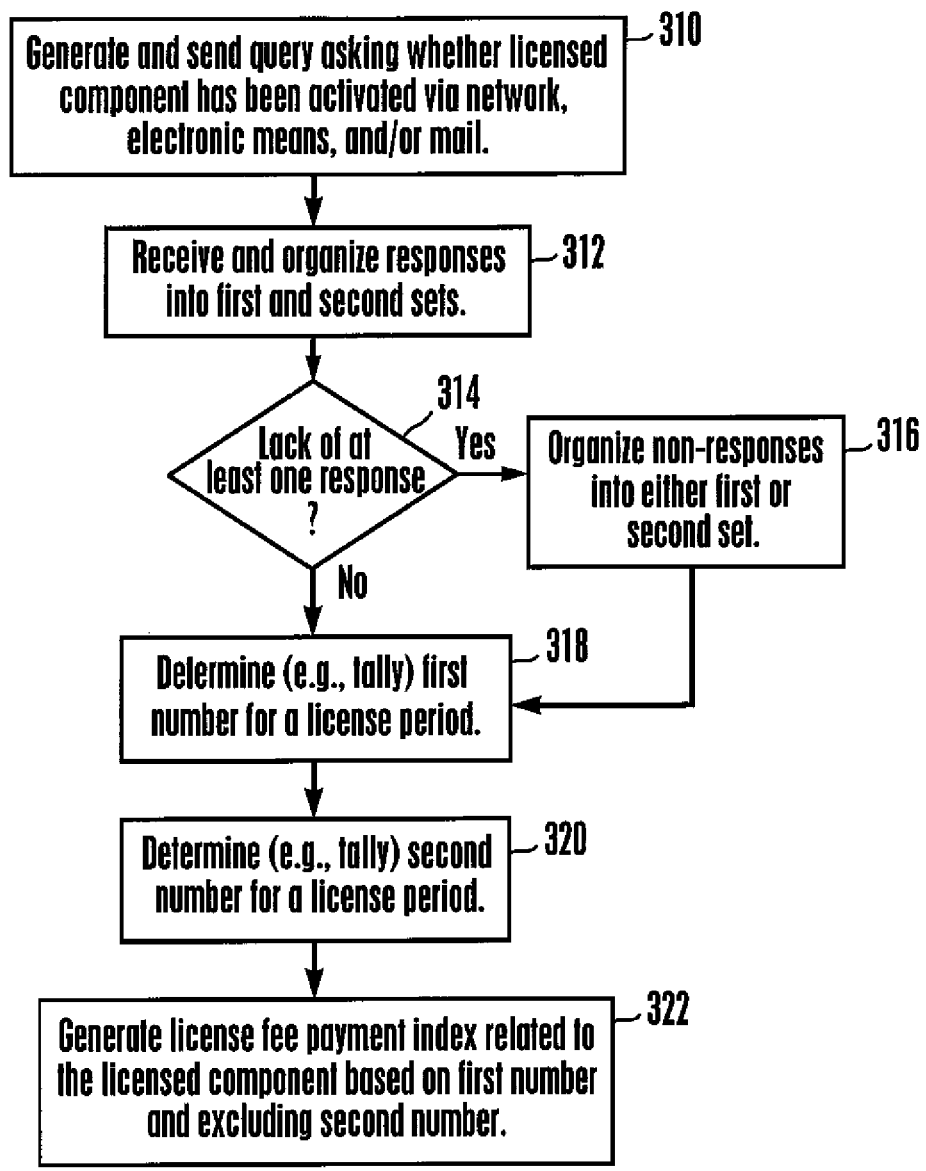
FIG. 11 is a flow chart for reducing licensing fee payments to account for non-use of at least one licensed component by generating a query asking whether a licensing component has been activated.

Thus, reference is now made to FIG. 11, which shows exemplary logic to be executed by, e.g., a server such as the server 302 for reducing licensing fee payments to account for non-use of at least one licensed component by generating a query asking whether a licensing component has been activated. Beginning at block 310, the logic generates and sends at least one query to one or more CE devices that, e.g., requests that the CE device respond with an indication as to whether the licensed component has been activated and/or used by the CE device. In some embodiments, the query may ask whether a licensing component has been activated within a particular license period. The license period may be, e.g., a period after which a licensed fee payment is due and may be, e.g., a period agreed upon between the licensor and licensee that recurs at regular intervals such as, e.g., every two weeks, every month, or every year.

In one embodiment, a query is transmitted to the CE devices (e.g., over a network such as the Internet) asking the CE devices (and, e.g., requesting a response) whether the licensed component was activated during the license period such that a set of CE devices that have activated a licensing component (e.g., a "first" set) and a set of CE devices that have not activated a licensing component (e.g., a "second"

set) may be established and/or determined based on responses from the CE devices that were provided to the server responsive to the query.

In addition to or in lieu of generating at least one query and sending it to at least one CE device as set forth above, in some embodiments the queries may be generated and sent to the users of CE devices asking the users to respond with an indication as to whether a licensed component for their respective CE device has been activated, and thus the first and second sets described above (CE devices that have activated a licensing component and of CE devices that have not activated a licensing component, respectively) may be based on responses received from the users. Accordingly, the queries may be sent to users via electronic means such as, e.g., email, text message, and/or a prompt presented on the CE device itself. In addition to or in lieu of sending the queries via electronic means, the queries may be sent to users via regular mail (e.g., a letter sent through the United States Postal Service).

Still in reference to FIG. 11, after at least one query has been generated and sent as set forth above, the logic moves to block 312 where the logic receives and groups responses to the queries that it has received into the first and second sets as described above. For example, the logic organizes one set of responses for CE devices that have activated a licensing component and one set of responses for of CE devices that have not activated a licensing component.

The logic then moves to decision diamond 314. At diamond 314, the logic determines whether a response for at least one CE device and/or user to which a query has been sent has not been received. If the logic determines that at least one response has not been received, the logic proceeds to block 316. If, however, the logic determines that all responses have been received, the logic proceeds directly to block 318. Reference will first be made to block 316.

After an affirmative determination is made at diamond 314, at block 316 the logic adds/includes/organizes all the non-responses to queries (e.g., a lack of a response to the license activation query associated with the non-responding CE device) into either the first or second sets. In some exemplary embodiments, the logic groups the non-responses into the first set, and in other exemplary embodiments the logic groups the non-responses into the second set. Whether the non-responses should be grouped into the first or second sets may be based on, e.g., an agreement between the licensor and the licensee. In the case where a non-response is considered NOT to be a license activation response, a window period may be established. Activation data is collected for the window limited period during which period an unlicensed component may be enabled prior to purchasing a license. During the window period the device can notify the user (e.g., using an onscreen prompt) that if no additional changes are made (that is, if the user declines to purchase a license for a particular licensed component), future use of the particular licensed component will not be possible. In this way royalty calculations need not be open ended.

Regardless, the logic proceeds to block 318 where the logic tallies, e.g., for the particular license period, a first number of CE devices that have activated the licensed component, e.g., based on the first set described above. The logic then moves to block 320 where the logic tallies, e.g., for the particular license period, a second number of CE devices that have not activated the licensed component, e.g., based on the second set described above.

However, it is to be understood that, as another example, the first and second numbers may be determined by other means such as, e.g., simply maintaining a running, real-time tally of CE devices that have activated the licensed component as responses are received and a running tally of CE devices that have not activated the licensed component as those responses are received so that the first and second numbers are based on and updated according to the running tallies. This may be done, e.g., in addition to or in lieu of grouping the responses into the first and second sets described above.

Note that non-responses may also be included in either the first or second numbers based on running tallies as set forth above. The server may determine a non-response (e.g., that a CE device has not responded) in such a case at, e.g., the end of the license period with no respond being received, and/or based on a threshold expiration/lapse of time from when the query was sent to when it is expected to be received, and then include the non-response(s) in either the first or second number based on, e.g., an agreement between the licensor and the licensee.

Regardless of how the first and second numbers are determined, the logic moves to block 322 where the logic generates a license fee payment index and/or amount related to the licensed component based on the first number. The index is understood to exclude the second number in exemplary embodiments. However, the second number may be included in, e.g., a report and/or accounting along with the first number so that, e.g., it is readily ascertainable from the report/accounting how many CE devices have not activated the licensed component. The report/accounting may also be generated by the logic, though this is not shown in FIG. 11.

Figure 12:
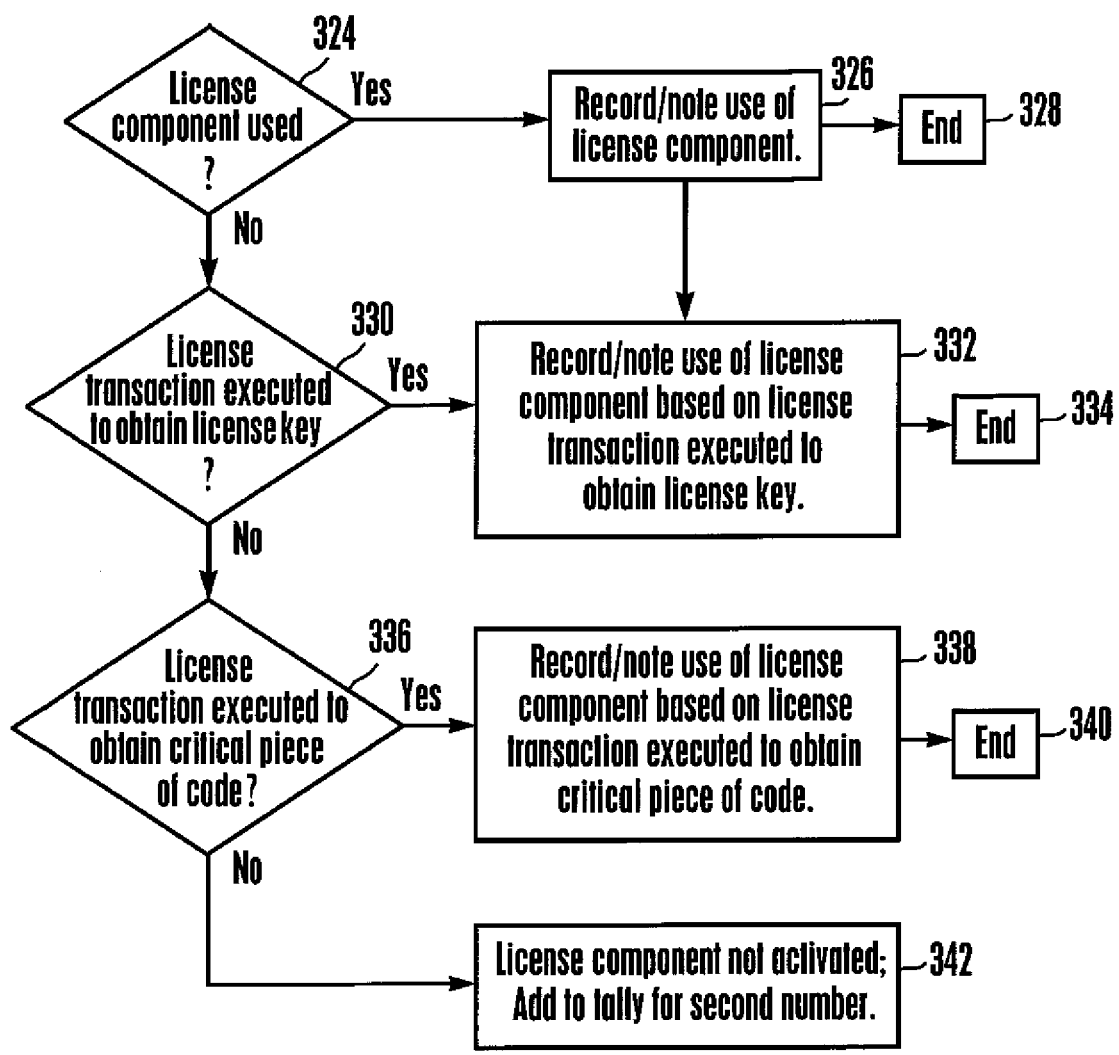
FIG. 12 is a flow chart for determining whether a licensed component has been activated.

Now in reference to FIG. 12, exemplary logic to determine whether a licensed component has been activated is shown. The logic may be executed by, e.g., a server such as those described above by e.g., polling the CE device(s), and/or maybe executed by the CE device to which, e.g., a query in accordance with present principles has been sent. Beginning at decision diamond 324, the logic determines whether the licensed component has been activated in the CE device by mere use of the licensed component in the licensed CE device.

If an affirmative determination is made at decision diamond 324, the logic moves to block 326. At block 326, the logic records, notes and/or otherwise recognizes that the licensed component has been used such that, e.g., that information may be used to increase the tally for the first number of CE devices described above. The logic then ends at block 328.

If however, a negative determination is made at decision diamond 324, the logic moves to decision diamond 330. At decision diamond 330, the logic determines whether the licensed component has been activated in the CE device by execution of a license transaction involving the licensed CE device to obtain a license key to unlock the licensed component for use in the licensed CE device.

If an affirmative determination is made at diamond 330, the logic moves to block 332. At block 332, the logic records, notes and/or otherwise recognizes that the licensed component has been activated by execution of the license transaction to obtain the license key such that, e.g., that information may be used to increase the tally for the first number of CE devices described above. The logic then ends at block 334.

If however, a negative determination is made at decision diamond 330, the logic moves to decision diamond 336. At decision diamond 336, the logic determines whether the licensed component has been activated in the CE device by execution of a license transaction involving the licensed CE device to make available to the licensed CE device a critical piece of code (e.g., software code) without which the licensed component is useless for its licensed function.

If an affirmative determination is made at diamond 336, the logic moves to block 338. At block 338, the logic records, notes and/or otherwise recognizes that the licensed component has been activated by execution of the license transaction involving the licensed CE device to make available to the licensed CE device the critical piece of code such that, e.g., that information may be used to increase the tally for the first number of CE devices described above. The logic then ends at block 340.

If however, a negative determination is made at decision diamond 336, the logic ends at block 342. At block 342, the logic concludes that the licensed component has not been activated in the CE device and records, notes and/or otherwise recognizes that the licensed component has not been activated such that, e.g., that information may be used to increase the tally for the second number of CE devices described above.

Referring back to the critical piece of code referenced above, it is to be understood that the critical piece of code may be incorporated into the licensed component upon successful consummation of the license transaction to configure the licensed component for its intended purpose in the CE device. Thus, without the critical piece of code (e.g., software code), the licensed component will be incapable of functioning properly and/or for its licensed purpose. Stated differently, even if all other software in the component is unlocked, unencrypted, and otherwise fully accessible without authentication credentials including license keys, with the critical piece of code missing the component cannot be used for its licensed function. Once the critical piece of code is, e.g., incorporated into the software of the CE device for the licensed component, the licensed component will function properly and/or for its licensed purpose.

Furthermore, it is to be understood that the critical piece of code, prior to the license transaction, may be stored remotely from the CE device. In addition to or in lieu of storing the critical piece of code remotely, prior to the license transaction, the critical piece of code may be stored locally to the CE device in a storage location (e.g., a protected area of a CE device's computer readable storage medium such as those described above) that prevents incorporation of the critical piece of code in the licensed component unless the license transaction is consummated.

Figure 13:
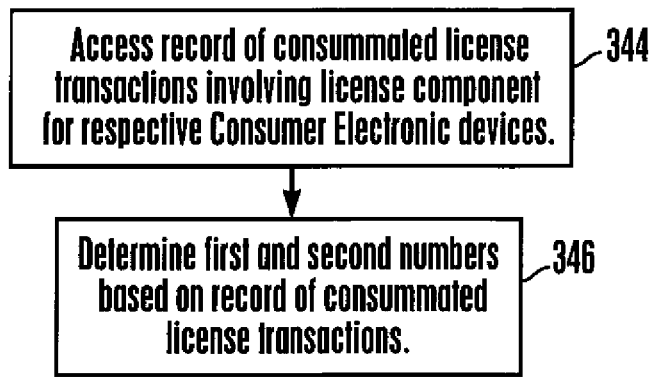
FIG. 13 is a flow chart for determining a number of licensed components that have been activated based on a record of consummated license transactions.

Finally, before moving on to FIG. 13, it is to be understood that only one, or any combination of the determinations made above as described in reference to FIG. 12, may be made in accordance with present principles.

Now in reference to FIG. 13, exemplary logic to be executed by, e.g., a server such as those described above for determining the first and second numbers based on a record of consummated license transactions from individual CE devices involving the licensed component is shown. Thus, beginning at block 344, the logic accesses a record of consummated license transactions from individual CE devices involving the licensed component. The logic then moves to block 346, where the logic determines the first and second numbers based on the accessed record. Accordingly, it may be appreciated that in such an embodiment, the first and second numbers may be determined without querying CE devices and/or users thereof regarding license transactions involving the licensed component. However, it is to be understood that the logic of FIG. 13 may be used in addition to querying CE devices and/or users thereof, if desired.

Figure 14:
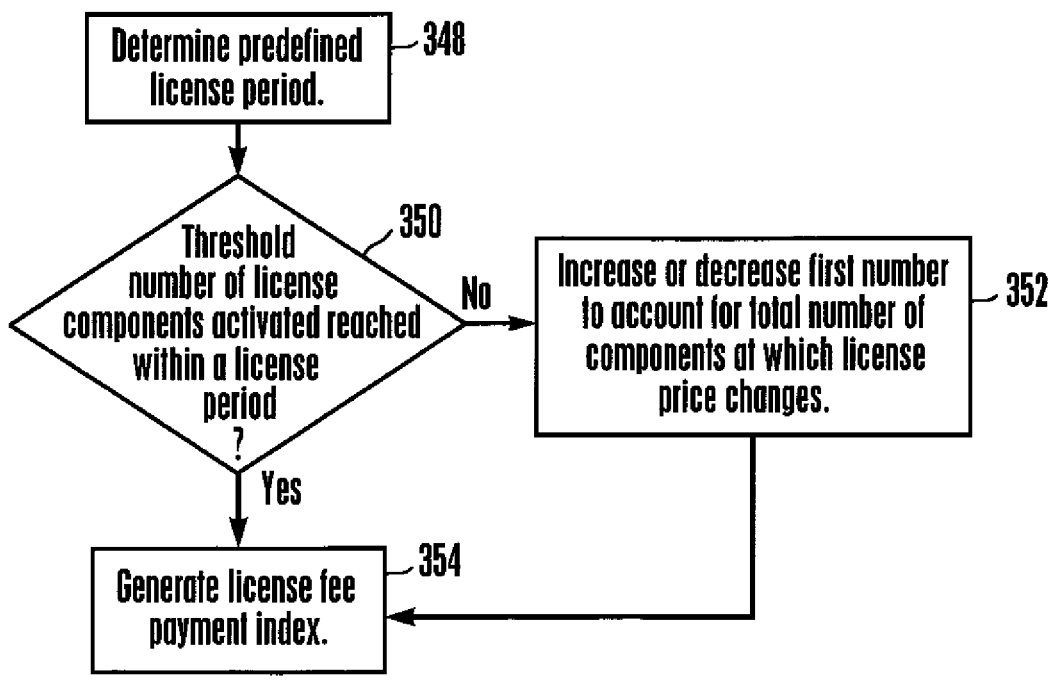
FIG. 14 is a flow chart for determining whether to increase or decrease the number to account for a total number of CE devices at which license pricing changes.

Now in reference to FIG. 14, exemplary logic to be executed by, e.g., a server such as those described above for determining whether to increase or decrease the first number to account for a total number of CE devices at which license pricing changes is shown. Beginning at block 348, a predefined license period is determined by the logic. The predefined license period may be, e.g., a period agreed upon between the licensor and licensee that recurs at regular intervals such as, e.g., every two weeks, every month, or every year.

After block 348, the logic proceeds to decision diamond 350 where the logic determines whether a threshold number of licensed components has been reached within the license period. It is to be understood that the determination at diamond 350 may be made based on, e.g., the first number pertaining to licensed components that have been activated as described above. It is to be further understood that the threshold may be associated with a quantity of licensed components at which the pricing for each licensed component changes as, e.g., agreed upon by a licensor and licensee of the licensed component. For instance, once such a threshold has been reached, the per-unit licensing fee for each licensed component to be paid by a licensee may be reduced to account for bulk component activation during the license period.

Regardless, if an affirmative determination is made at diamond 350, the logic proceeds directly to block 354. However, before describing block 354, block 352 will be described. It is reached by the logic if a negative determination is made at diamond 350. Thus, at block 352 the logic may increase or decrease the number of licensed components (e.g., the first number referenced above) to account for a total number of CE devices/licensed components at which the license pricing changes.

In some embodiments, the number may be increased or decreased through, e.g., accounting methods and activation forecasting methods. For instance, licensed components that are expected and/or estimated (e.g., by a server processor as described herein) to be activated in the future (e.g., before the expiration of the license period at issue when, e.g., the logic of FIG. 14 is executed prior to the expiration) may be added to or subtracted from the number. In addition or in the alternative, the number may be artificially increased or decreased based on, e.g., an agreement between the licensor and licensee if the number is near the threshold but has not reached it (e.g., five licensed components above or below the threshold). Further, in addition to or in the alternative, the number may be increased or decreased irrespective of being near but not at the threshold.

Continuing in reference to FIG. 14, after block 352 the logic proceeds to block 354, it being understood that the logic may have proceeded directly to block 354 from diamond 350 if an affirmative determination was made at diamond 350. Regardless, at block 354 a licensing fee payment index is generated, e.g., based on the number adjusted at block 352 to thereby account for a licensing fee price change for a particular threshold as set forth above. However, it is to be understood that in other embodiments the index may not account for a price change or may account for a price change based on a number that was not increased or decreased as set forth above.

Figure 15:
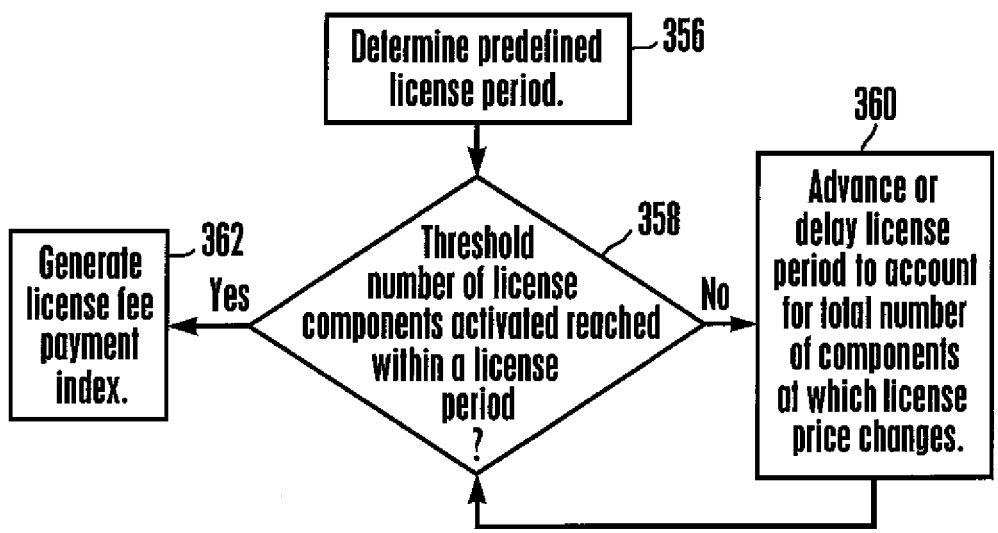
FIG. 15 is a flow chart for determining whether to advance or delay the license period for which the number is reported to account for a total number of license components at which license pricing changes.

Turning to FIG. 15, exemplary logic to be executed by, e.g., a server such as those described above for determining whether to advance or delay the license period for which the number is reported to account for a total number of CE devices/license components at which license pricing changes is shown. Beginning at block 356, a predefined license period is determined by the logic.

After block 356, the logic proceeds to decision diamond 358 where the logic determines whether a threshold number of licensed components has been reached within the license period. It is to be understood that the determination at diamond 358 may be made as set forth above in reference to FIG.

14. If an affirmative determination is made at diamond 358, the logic proceeds directly to block 362. However, before describing block 362, block 360 will be described.

Block 360 is reached by the logic if a negative determination is made at diamond 358. Thus, at block 360 the logic may advance or delay the license period for which the number is reported to account for a total number of CE devices/licensed components at which license pricing changes. In some embodiments, the license period may be advanced or delayed by, e.g., a few days or a period agreed upon by a licensor and licensee so that the threshold may be reached. After block 360, the logic may revert back to diamond 358 and proceed accordingly. Thus, referring back to diamond 358, once an affirmative determination is made, the logic may proceed to block 362. At block 362, a licensing fee payment index is generated, e.g., as set forth above.

Figure 16:
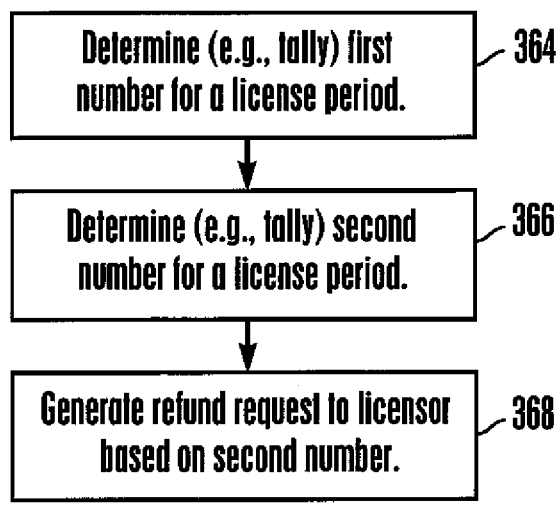
FIG. 16, is a flow chart for generating a request to a licensor of at least one licensed product for a refund of license fees.

Continuing the detailed description in reference to FIG. 16, exemplary logic to be executed by, e.g., a server such as those described above for generating a request to a licensor of at least one licensed product for a refund of license fees is shown. Beginning at block 364, the logic tallies, e.g., for the particular license period, a first number of CE devices that have activated the licensed component, e.g., as described above. The logic then moves to block 366 where the logic tallies, e.g., for the particular license period, a second number of CE devices that have not activated the licensed component, e.g., as also described above. Blocks 364 and 366 may both be executed, e.g., similar to analogous determinations described in reference to FIG. 11.

The logic then concludes at block 368 where the logic generates a request to a licensor of the licensed product for a refund of license fees based on, e.g., the second number. Thus, for instance, if a licensee or contract manufacturer of the licensee has paid a licensor for all licensed components included in respective CE devices at manufacture of the CE device regardless of whether the components are or will be activated, upon determining that some components were not actually activated by users of the CE devices once purchased, a refund of licensing fees paid for components that were not activated may be appropriate and thus requested.

Without reference to particular figure, present principles also recognize that, e.g., for one or more licensed components of CE devices, after the beginning of a license period, the amount of licensed components to be activated during the license period may be estimated with reasonable accuracy in order to undertake present principles (e.g., to generate a license fee payment index). Accordingly, when license agreements between licensors and licensees are negotiated and renegotiated, the thresholds (such as those described above) and/or terms of the agreement(s) may be determined, evaluated, and/or adjusted to reflect a more equitable agreement. If desired, a feedback mechanism such as a smartphone software application or webpage may be used to leave feedback on licensing agreements so that such feedback may be considered to modify existing and/or future license agreements.

Accordingly, it may now be appreciated that in instances where license fees are paid periodically, a licensee can "pulse" users and/or CE devices within some delta time frame (e.g., within 2 weeks or within a month) of a license fee payment due date to determine which license components for respective CE devices have been activated. This process can be at least partially automated using a server to query respective CE devices and requesting or requiring a response from those CE devices regarding which components were used during the license period at issue.

Furthermore, present principles recognize that, for non-networked devices, a licensee may send a questionnaire(s) to users of the CE devices via email or another form of communication to (e.g., residential or business) addresses obtained, e.g., at a point of sale of the CE device. In the latter case, the "default" licensee procedure for the licensee may be to pay the license fee if the licensee cannot determine whether the component at issue has been activated (e.g., if the user of the CE device does not respond to a query email with the requisite information) to avoid a payment dispute with the licensor. However, an opposite procedure may also be adopted by a licensee such as, e.g., the "default" licensee procedure may be to not pay a license fee under a license agreement if the licensee does not receive a response containing the requisite information from a user of the CE device.

Note that once a license fee to be paid has been determined, a payment may be made automatically made under control of, e.g., a server executing any or all of the logic set forth above to make a payment from an account associated with the licensee. In addition to that, or in the alternative, once the license fee has been determined, the server may simply generate a report and/or notify, e.g., an accounting or treasury department of the licensee so that the department may submit the correct payment to the licensor.

Moreover, present principles recognize that communication (e.g., sending and responding to queries) may be done over one or more of the following such that, e.g., the server may use the same or a different communication means than a responding CE device in accordance with present principles: Plain old telephone service (POTS), Short Message Service (SMS), email, any suitable IP connection, instant messaging, iMessage, Google Cloud Messaging, C2DM, a LAN using another device as an intermediary, a social networking service such as Facebook or Twitter, a cable or satellite connection using, e.g., a set top box, etc.

Even further, note that any of the logic described above may be executed, e.g., upon an administrator's request in addition to being executed automatically at, e.g., regular intervals. Thus, if a licensee wishes to evaluate the number of licensed components and, e.g., request a refund and/or make a license fee payment for any particular license period at any time, he or she may do so by inputting such commands to the server.

Without limitation, the need for paying for licenses for the following technologies may be determined during TV set-up or subsequently by automatically detecting whether the technologies are being used:

Video Decoders

MPEG-2 video, MPEG-2 video with optical disk, MPEG4 advanced video coding (AVC), MPEG4 Visual, MPEG video codec (VC) 1

Audio Decoders unified AAC (MPEG 2&4 AAC) 2ch, unified AAC (MPEG 2&4 AAC) 3ch, Dolby Digital AC3 2ch, Dolby Digital AC3 5.1ch, Dolby Digital Plus (DD+) 2ch, ProLogic2 (Surround Sound), MPEG audio 1&2 layer 1, 2, 3) MP3, DTS_Blueray disk (BD) (2CH/2CH+ Digital Out), BBE Sound, sound retrieval system (SRS) sound EPGs Gemstar Guide EPG, non-Gemstar EPG (SI-EPG)

Demodulators

Association of Radio Industries and Businesses (ARIB) (D+BS+CS), ATSC, digital video broadcasting (terrestrial) (DVB-T)

Other Components Including Digital Rights Management (DRM)

Joint Photographic Expert Group (JPEG), digital transmission content protection (DTCP)/AACP/Open MG, HDMI, System Synchronized Brightness Control (contrast enhancement), Inverter controller integrated circuit (IC), IEEE 802.11 wireless license, IEEE 802.11(n), BD Pool (player), BD Pool (recorder), digital video disk (DVD) format, IEEE 802.11/16, IEEE 1394

Software

JAVA, MHP/Ginga interactive TV software, JAVA-BD combination, DivX codec software, Windows Media Audio, Windows Media Video, Windows Media Network read, Windows Media digital rights management (DRM), audio watermark, Netfront, web browser software.

Additionally, production encryption keys and test encryption keys may be used to permit testing a licensable component in production, pre-sale, without triggering the above-described license request mechanisms. A TV may be placed in a test activation mode used only in the manufacturing or test phase, and if desired the test mode may have a hardwired time out. A test key or keys can be used to activate licensable components and the license request algorithm recognizes a test key and responsive to the recognition does not request a license. The test activation mode may be hardwired to deactivate after a single power cycle and the TV processor may not permit reactivation of the test mode thereafter. Activation of a licensable component thereafter requires a production key which is associated with a license request.

The messaging, activation, and license payment logic in FIG. 9 may be executed by servers respectively associated with the CM and BNM and having processors, computer readable storage media, network interfaces and the like along the lines of the servers described above.

It is to be understood that the figures and detailed description of the present application generally show methods steps in conjunction with the devices disclosed herein. It is to be further understood that present principles may be implemented by state logic as well as deterministic logic flows.

While the particular COORDINATING LICENSE ACTIVATION OF LICENSABLE AUDIO VIDEO (AV) DEVICE COMPONENTS BETWEEN CONTRACT MANUFACTURER AND BRAND MANUFACTURER is herein shown and described in detail, it is to be understood that the subject matter which is encompassed by the present invention is limited only by the claims.

What is claimed is:

1. Server for reducing license fee payments to account for non-use of a licensed component, comprising:
    processor;
    computer readable storage medium accessible to the processor and bearing instructions which when executed by the processor cause the processor to:
    determine, for a license period, a first number of consumer electronic (CE) devices that have activated the licensed component;
    determine, for the license period, a second number of CE devices that have not activated the licensed component; and
    generate a license fee payment index related to the licensed component based on the first number and excluding the second number.

2. The server of claim 1, wherein the instructions when executed by the processor cause the processor to transmit to CE devices a query asking CE devices whether the licensed component was activated, the first and second numbers being based on responses received from the CE devices.

3. The server of claim 2, wherein the query is sent over a network.

4. The server of claim 1, wherein the instructions when executed by the processor cause the processor to generate queries to users of CE devices a query asking users whether the licensed component was activated, the first and second numbers being based on responses received from the users.

5. The server of claim 4, wherein the queries are sent to users via electronic means.

6. The server of claim 4, wherein the queries are sent to users via regular mail.

7. The server of claim 1, wherein the licensed component is determined as having been activated in a licensed CE device by mere use of the licensed component in the licensed CE device.

8. The server of claim 1, wherein the licensed component is determined as having been activated in a licensed CE device by execution of a license transaction involving the licensed CE device to obtain a license key to unlock the licensed component for use in the licensed CE device.

9. The server of claim 1, wherein the licensed component is determined as having been activated in a licensed CE device by execution of a license transaction involving the licensed CE device to make available to the licensed CE device a critical piece of code without which the licensed component is useless for a licensed function, the critical piece of code being incorporated into the licensed component upon successful consummation of the license transaction to configure the licensed component for its intended purpose in the licensed CE device.

10. The server of claim 9, wherein the critical piece of code, prior to the license transaction, is stored remotely from the licensed CE device.

11. The server of claim 9, wherein the critical piece of code, prior to the license transaction, is stored locally to the licensed CE device in a storage location that prevents incorporation of the critical piece of code in the licensed component unless the license transaction is consummated.

12. The server of claim 1, wherein the processor determines the first and second numbers based on responses received from license activation queries to CE devices and/or to users thereof, and the first number but not the second number includes non-responding CE devices, a non-responding CE device being established by a lack of a response to the license activation query associated with the non-responding CE device.

13. The server of claim 1, wherein the processor determines the first and second numbers based on responses received from license activation queries to CE devices and/or to users thereof, and the second number but not the first number includes non-responding CE devices, a non-responding CE device being established by a lack of a response to the license activation query associated with the non-responding CE device.

14. The server of claim 1, wherein the processor determines the first and second numbers based at least in part on a record of consummated license transactions from individual CE devices involving the licensed component.

15. The server of claim 14, wherein the processor determines the first and second numbers without querying CE devices and/or users thereof regarding license transactions involving the licensed component.

16. The server of claim 1, wherein the first number is increased or decreased to account for a total number of CE devices at which license pricing changes.

17. The server of claim 1, wherein the license period for which the first number is reported is advanced or delayed to account for a total number of CE devices at which license pricing changes.

18. Server for reducing license fee payments to account for non-use of a licensed component, comprising:
    processor;

computer readable storage medium accessible to the processor and bearing instructions which when executed by the processor cause the processor to:

determine, for a license period, a first number of consumer electronic (CE) devices that have activated the licensed component;

determine, for the license period, a second number of CE devices that have not activated the licensed component; and generate a request to a licensor of the licensed product for a refund of license fees based on the second number.

19. The server of claim 18, wherein the first and second numbers are determined by querying the CE devices and/or querying at least one user of respective CE devices.

20. A method, comprising:

determining using a digital processor, for a license period, a number of consumer electronic (CE) devices that have activated a least one licensed component associated with each respective CE device by querying the CE devices and/or querying at least one user of respective CE devices; and determining a license fee payment amount based on the number.

* * * * *